(12) United States Patent
Heo et al.

(10) Patent No.: US 11,640,376 B2
(45) Date of Patent: May 2, 2023

(54) DECENTRALIZED IDENTIFIER MANAGEMENT VIA BLOCKCHAINS

(71) Applicant: ELECTRONICS AND TELECOMMUNICATIONS RESEARCH INSTITUTE, Daejeon (KR)

(72) Inventors: Hwan Jo Heo, Daejeon (KR); Sung Kee Noh, Daejeon (KR); Chang Hyun Lee, Daejeon (KR); Nam Seok Ko, Daejeon (KR)

(73) Assignee: ELECTRONICSAND TELECOMMUNICATIONS RESEARCH INSTITUTE, Daejeon (KR)

( * ) Notice: Subject to any disclaimer, the term of this patent is extended or adjusted under 35 U.S.C. 154(b) by 260 days.

(21) Appl. No.: 16/776,737

(22) Filed: Jan. 30, 2020

(65) Prior Publication Data
US 2020/0301894 A1    Sep. 24, 2020

(30) Foreign Application Priority Data

Mar. 21, 2019  (KR) .................. 10-2019-0032394

(51) Int. Cl.
G06F 16/20 (2019.01)
G06F 16/182 (2019.01)
G06F 16/13 (2019.01)
H04L 9/06 (2006.01)

(52) U.S. Cl.
CPC ........ *G06F 16/1837* (2019.01); *G06F 16/137* (2019.01); *H04L 9/0637* (2013.01)

(58) Field of Classification Search
CPC ... G06F 16/1837; G06F 16/137; H04L 9/0637
See application file for complete search history.

(56) References Cited

U.S. PATENT DOCUMENTS

| | | | |
|---|---|---|---|
| 6,542,907 B1 | 4/2003 | Cohen | |
| 11,218,313 B1* | 1/2022 | Raghavan | H04L 9/0643 |
| 2013/0139268 A1 | 5/2013 | An et al. | |
| 2013/0282707 A1* | 10/2013 | Stiffelman | G06F 16/334 707/723 |
| 2014/0222791 A1* | 8/2014 | Childress | G06F 16/958 707/723 |
| 2014/0356846 A1* | 12/2014 | Su | G06N 5/043 434/362 |
| 2015/0200830 A1* | 7/2015 | Adington | H04L 47/24 709/201 |
| 2017/0317889 A1 | 11/2017 | Moon et al. | |
| 2018/0060496 A1 | 3/2018 | Bulleit et al. | |
| 2018/0096360 A1* | 4/2018 | Christidis | G06Q 20/02 |
| 2019/0188702 A1* | 6/2019 | Bolla | H04L 9/3239 |
| 2019/0229914 A1* | 7/2019 | Patel | G06F 21/45 |
| 2019/0294679 A1* | 9/2019 | Grube | G06F 40/45 |
| 2019/0354725 A1* | 11/2019 | Lowagie | H04L 9/0891 |
| 2020/0097608 A1* | 3/2020 | Xiu | G06N 5/003 |
| 2020/0265530 A1* | 8/2020 | Lee | G06Q 50/184 |
| 2020/0272619 A1* | 8/2020 | Alferov | H04L 9/0643 |
| 2020/0274389 A1* | 8/2020 | Islam | H04L 9/0637 |

* cited by examiner

*Primary Examiner* — Tarek Chbouki
(74) *Attorney, Agent, or Firm* — LRK Patent Law Firm

(57) ABSTRACT

Provided are an electronic device and method for managing a decentralized identifier (DID) and more specifically a device and method for managing a DID by giving authority over the DID to a user according to a priority level selected by the user.

14 Claims, 5 Drawing Sheets

FIG. 3B

```
{
 "@context": "https://w3id.org/did/v1",
 "id": "did:example:123456789abcdefghi",
 "publickey": [{
  "id": "did:example:123456789abcdefghi#keys-1",
  "type": "RsaVerificationKey2018",
  "owner": "did:example:123456789abcdefghi",
  "publickeyPem": "-----BEGIN PUBLIC KEY...END PUBLIC KEY---\r\n"
 }],
 "authentication": [{
  "type": "RsaSignatureAuthentication2018",
  "publickey": "did:example:123456789abcdefghi#keys-1"
 }],
 "srvice": [{
  "type": "ExampleService",
  "serviceEndpoint": "https://example.com/endpoint/8377464"
 }],
 "nonce": "a1f23f....babe"
}
```

300

310

320

DECENTRALIZED IDENTIFIER MANAGEMENT VIA BLOCKCHAINS

CROSS-REFERENCE TO RELATED APPLICATION

This application claims priority to and the benefit of Korean Patent Application No. 10-2019-0032394, filed on Mar. 21, 2019, the disclosure of which is incorporated herein by reference in its entirety.

BACKGROUND

1. Field of the Invention

The disclosure relates to a decentralized identifier (DID) management technology and more particularly, to an electronic device and method for managing a DID.

2. Description of Related Art

According to a related art, service providers internally manage the identity information of users for user authentication. On the other hand, service providers may delegate the management of identity information of users to a third-party (e.g., an identity provider) and authenticate users via the identity service provided by such entities.

However, both models require the reliability of a single entity, the service provider or the identity provider respectively. The entity which manages the identity information of users becomes a single point of failure that leaks personal information if compromised.

To solve the problem, the concept of self-sovereign digital identity has been introduced, and a system that realizes the digital identity authentication leveraging decentralized identifiers (DIDs) is under research and development. In a DID-based identity authentication system, a user may independently create and revoke his or her DIDs and safely store his or her DIDs in a network rather than a centralized data store in a distributed manner; thus, blockchains are commonly used to store DID information.

SUMMARY OF THE INVENTION

The decentralized identifier (DID) scheme is under standardization by the world wide web consortium (W3C), and a self-sovereign digital identity system is being developed on the basis of the standard. However, the current standard has the following two problems:

Lack of human-readability: a DID is randomly generated by a user, and a user may generate a random string which lacks human readability as a DID in order to generate a DID not identical to other DIDs.

Lack of identifier authority: when randomly generated DIDs are identical to each other, a system based on DIDs lacking human readability generates another DID to avoid duplication. Therefore, when a readable identifier selected by a user is identical to an existing identifier, another user who has the identifier already gets authority to use the identifier. When the usage time of an identifier is expired or a new competitor wants to use a preoccupied identifier, it is necessary to give the authority to use the identifier again. Also, when a malicious attacker checks a transaction of a user registering an identifier and makes a denial of service (DoS) attack by repeatedly generating a transaction of registering the same identifier, a DID management method is necessary to prepare for a malicious attack by blocking the DoS attack.

The disclosure is directed to providing a DID management device and method for giving authority over a DID to a user on the basis of a priority level of the DID selected by the user.

The above-described object, other objects, and advantages of various embodiments disclosed herein and methods for achieving them will become apparent from exemplary embodiments described in detail with reference to the accompanying drawings.

According to an embodiment of the present invention, there is provided a method of managing a DID includes receiving candidate documents including a DID, deciding priority levels of the candidate documents for the DID, and selecting a winner document which will have authority over the DID on the basis of the priority levels.

According to an embodiment of the present invention, electronic device for managing a DID includes a blockchain storage configured to store authorized documents for DIDs, and a processor configured to receive candidate documents including the decentralized identifier, decide priority levels of the candidate documents for the decentralized identifier, select a winner document which will have authority over the decentralized identifier on the basis of the priority levels, and register the winner document as the authorized document for the decentralized identifier.

BRIEF DESCRIPTION OF THE DRAWINGS

The above and other objects, features and advantages of the disclosure will become more apparent to those of ordinary skill in the art by describing exemplary embodiments thereof in detail with reference to the accompanying drawings, in which:

FIGS. 3A and 3B show an exemplary DID document;

DETAILED DESCRIPTION OF EXEMPLARY EMBODIMENTS

Figure 1:
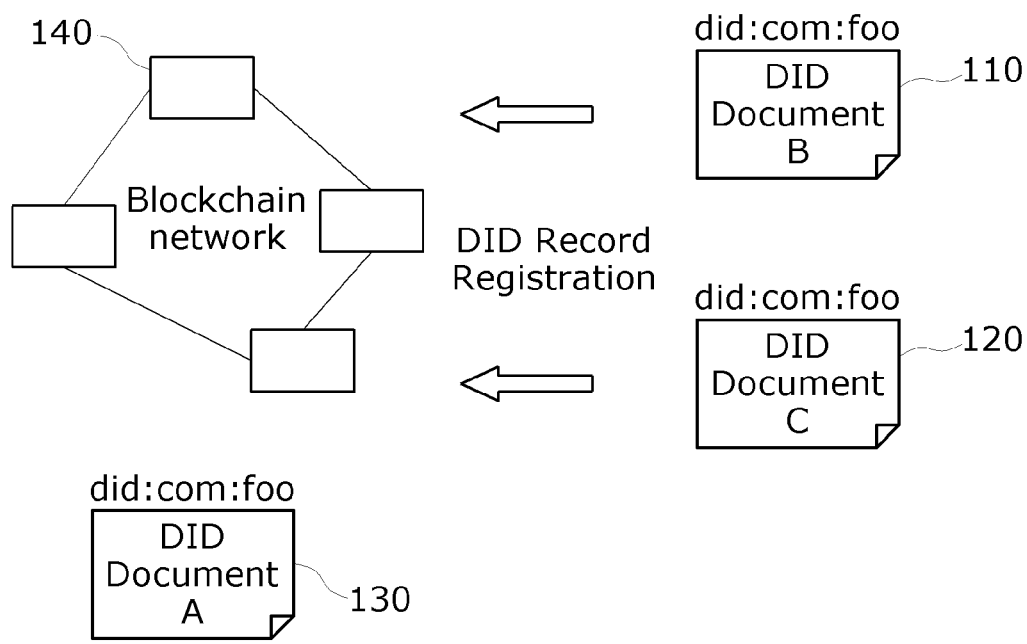
FIG. 1 schematically shows a method of managing a decentralized identifier (DID) according to an exemplary embodiment of the disclosure.

FIG. 1 schematically shows decentralized identifier (DID) management according to an exemplary embodiment of the disclosure.

According to an exemplary embodiment, a DID management device may support use of a readable DID according to a selection of a user while conforming to a standard DID data format. To this end, an exemplary embodiment of the disclosure proposes a method of deciding authority to use a DID. Specifically, in the exemplary embodiment, an additional property including an arbitrary value may be added to a DID document by using expandability of the standard DID data format, and the priority level of a corresponding DID may be relatively determined through the hash value of the DID document.

For example, in the blockchain storage 140 of FIG. 1, authority to use the DID "did:com:foo" is registered for DID document A 130. User B wants to register DID document B 110 as a DID record in the blockchain storage 140 together with the same DID "did:com:foo." Likewise, user C wants to register DID document C 120 as a DID record in the blockchain storage 140 together with the same DID "did:com:foo." Each of documents A, B, and C includes an additional property.

In this case, the DID management device may relatively determine the priority level of the DID "did:com:foo" on the basis of DID documents A, B, and C, select a user who will have the authority to use "did:com:foo" from among users A, B, and C, and store a DID document of the selected user as a DID record in the blockchain storage 140.

Figure 2:
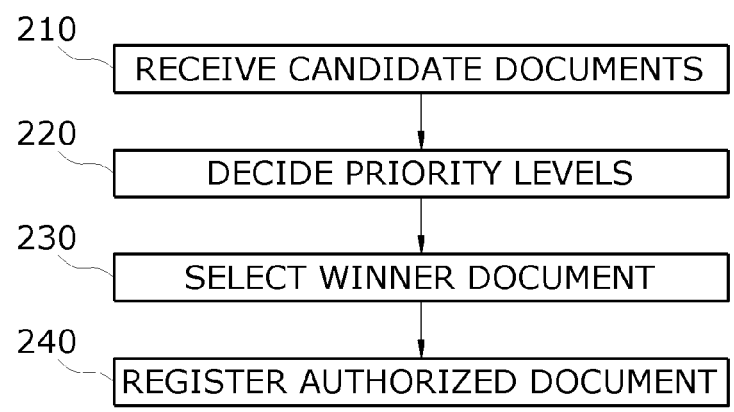
FIG. 2 is a flowchart illustrating the method of managing a DID according to an exemplary embodiment of the disclosure.

FIG. 2 is a flowchart illustrating a DID management method according to an exemplary embodiment of the disclosure.

A DID management device 400 according to an exemplary embodiment of the disclosure will be described with reference to FIG. 4 prior to the DID management method.

The DID management device 400 may include a communicator 410, a controller 420, and a storage 140. For example, the DID management device 400 may be a computing device including a processor which operates the controller 420.

The communicator 410 is a wired or wireless communication module which performs communication with the outside of the DID management device 400 including a user terminal.

The controller 420 performs each operation of the DID management method and controls the communicator 410 and the storage 140. For example, the controller 420 is operated by the processor included in the DID management device 400. Alternatively, the controller 420 may include at least one processor.

The storage 140 is a repository for storing registered DID records. For example, the storage 140 may be implemented as a blockchain network.

Referring back to FIG. 2, in operation 210, the controller 420 (see FIG. 4) receives candidate documents including a DID.

The candidate documents are DID documents including a DID and an additional property. The candidate documents are one or more DID documents which compete with each other to be a winner document having authority to use the DID through operation 220 to operation 240 to be described below. The DID documents will be described further with reference to FIGS. 3A and 3B.

Figure 3A:
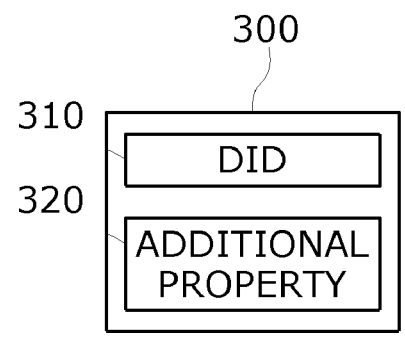

FIG. 3A and FIG. 3B shows an exemplary DID document 300.

FIG. 3A is a block diagram of the exemplary DID document 300. According to an example, the DID document 300 includes a DID 310 and an additional property 320. The candidate document received in operation 210 of FIG. 2 is also the DID document 300 and thus includes the DID 310 and the additional property 320. In an example, the additional property 320 includes a random string. The random string denotes, for example, a string having a random length and including random types of characters generated in a random order.

FIG. 3B shows an example of the DID document 300.

An identifier (ID) property 310 corresponds to the DID 310 of FIG. 3A. A DID document 300 of FIG. 3B is a document in which the DID 310 is "did:example:123456789abcdefghi."

A nonce property 320 corresponds to the additional property of FIG. 3A. Properties other than the nonce property 320, which is the additional property 320, are defined in the DID standard. In the DID document 300 of FIG. 3B, the additional property 320 is set to a random string such as "a1f23f . . . babe."

A user may generate the DID document 300 including the DID 310 and then add a nonce property having an arbitrary value as the additional property 320. Subsequently, the user may find an appropriate nonce value by repeatedly inputting nonce values through a computing device until the overall DID document 300 has a sufficiently small hash value. In other words, the user may adjust the hash value of a DID document on the basis of an additional property.

The nonce value which minimizes the hash value is reflected in the DID document 300 as the additional property 320 and transferred to the DID management device 400 as a candidate document. The DID management device 400 performs operations 210 to 240 to select a candidate document having the minimum hash value from among a plurality of candidate documents for the same DID in various situations.

Referring back to FIG. 2, in operation 220, the controller 420 decides priority levels of the candidate documents received in operation 210 for the DID. The priority levels mean the order of priority of the candidate documents for the DID. For example, the priority level of a first candidate document for the DID may be a relative priority level determined through a comparison with the priority level of a second candidate document for the same DID.

In an example, the controller 420 decides the priority level of a candidate document on the basis of the hash value of the candidate document. For example, when the hash value of a candidate document is smaller, the priority level of the candidate document is higher, and thus the value of the priority level (hereinafter, may be referred the priority level value) (e.g., a ranking value such as the first or the second) is smaller. For this reason, a user may perform an operation for minimizing the hash value of a candidate document while changing additional properties of the candidate document according to a proof-of-work (PoW) scheme in order to check authority to use a specific DID. In other words, the priority level of a candidate document may be adjusted on the basis of an additional property.

In operation 230, the controller 420 selects a winner document which will have authority over the DID on the basis of the priority levels determined in operation 220. The winner document is the DID document 300 which includes the DID 310 and the additional property 320.

In an example, the controller 420 may select a candidate document whose priority level determined in operation 220 is the highest as the winner document of the DID. This is an operation method for maintaining a DID document having the minimum priority level value.

Specifically, in operation 230, the controller 420 may inquire whether a document has already been registered in relation to the DID included in the received candidate document. To this end, the controller 420 may transfer an enquiry for searching for a previously registered document to the storage 140. When an enquiry result of the storage 140 indicates that a document has already been registered in relation to the DID, the controller 420 recognizes the registered document as a candidate document. In other words, the controller 420 decides the priority level of the registered document for the DID, and when the priority level of the registered document is higher than the priority level of the received candidate document, the registered document becomes the winner document. In this case, the winner document of the DID is maintained as the registered document, and the other candidate document fails to acquire the authority to use the DID and thus operation 240 may not be performed.

In this operation method, the user obtains authority to use a specific DID according to a PoW scheme. For example, it is assumed that, document A 130 has been registered in relation to the DID "did:com:foo" in the blockchain network 140 as described above with reference to FIG. 1. In this case, two users attempt to register candidate document B 110 and candidate document C 120, which are different from each other, as DID records together with the DID "did:com:foo."

Considering that a priority level value is proportionate to a hash value, those of ordinary skill in the art would easily understand that a hash value and a priority level value may be replaced with each other.

According to the method of maintaining a DID document having the minimum hash value, a document having the minimum hash value is selected from among document A 130 which has already been registered and document B 110 and document C 120 which are newly attempting registration.

It is assumed that $h_A$=hash(DID Document A), $h_B$=hash(DID Document B), and $h_C$=hash(DID Document C).

When $h_B<h_A$ and $h_B \leq h_C$, the controller 420 selects candidate document B 110 as the winner document of "did:com:foo."

When $h_C<h_A$ and $h_C \leq h_B$, the controller 420 selects candidate document C 120 as the winner document of "did:com:foo."

When $h_B=h_C<h_A$, the controller 420 selects the winner document between candidate document B 110 and candidate document C 120 according to defined rules. As an example, the controller 420 selects a candidate document which has been received first as the winner document. As another example, the controller 420 selects a candidate document having a greater number of registration attempts as the winner document.

Meanwhile, when and $h_A \leq h_B$ and $h_A \leq h_C$, the controller 420 may reject both candidate document B 110 and candidate document C 120 and select candidate document A 130 as the winner document.

According to the above-described exemplary embodiment, the controller 420 may register a candidate document having the minimum hash value regardless of whether a DID record has been registered in relation to a specific DID.

According to various embodiments, the controller 420 inquires about documents registered in relation to a DID included in a received candidate document. And the controller 420 selects the winner document from among candidate documents on the basis of the priority levels of the candidate documents only when no document has been registered in relation to the DID. According to this method, when a document has been registered, the controller 420 selects the registered document as the winner document. A case in which no document has been registered may include a case in which a registered document is not present, a case in which a registered document has been deleted, and a case in which the validity period of a registered document has passed. In other words, when a registered document is removed or the validity period passes, the registered document which has been removed or has the passed validity period is excluded from candidate documents for the winner document.

When no document has been registered in relation to the DID, the controller 420 may select a candidate document determined in operation 220 to have the minimum priority level value as the winner document of the DID.

According to this operation method, when document A 130 registered in relation to the specific DID is not present, the controller 420 selects a candidate document having a higher priority level, that is, a smaller hash value (or, smaller priority level value), between candidate document B 110 and candidate document C 120 which attempt registration as the winner document.

For example, referring to FIG. 1, when document A 130 registered in relation to the DID "did:com:foo" is present, both candidate document B 110 and candidate document C 120 which newly attempt registration are rejected.

When document A 130 has not been registered in relation to "did:com:foo," document A 130 has been registered but deleted by a clear request of a user, or the validity period has passed, candidate document B 110 is selected as the winner document of "did:com:foo" in the case of $h_B<h_C$. In the case of $h_C<h_B$, candidate document C 120 is selected as the winner document of "did:com:foo." In the case of $h_B=h_C$, one of the two candidate documents is selected according to predetermined rules.

According to this operation method, a registered DID record is maintained, but when the registered DID record is expired or removed, a candidate document corresponding to a request having the minimum hash value among a plurality of requests for registration is selected as the winner document. As a result, a candidate document of a user who has performed the largest amount of hash calculation is highly likely to be selected as the winner document.

Subsequently, in operation 240, a transaction for registering the selected winner document is accommodated in a block.

In operation 240, the controller 420 stores the winner document selected in operation 230 in the storage 140 as an authorized document for the DID. In other words, the controller 420 registers the winner document selected in operation 230 as an authorized document for the DID in the blockchain storage 140. To this end, the controller 420 generates a transaction for the DID and registers the transaction in the blockchain storage 140.

Figure 4:
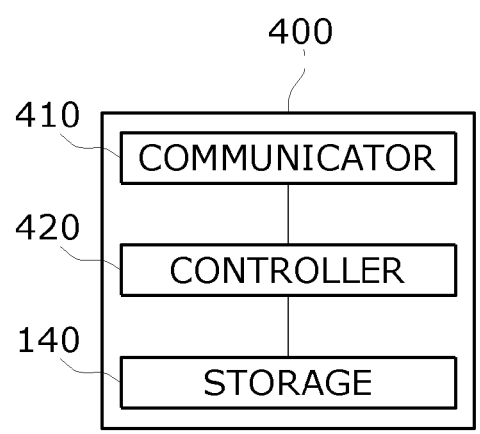
FIG. 4 is a block diagram of a device for managing a DID according to an exemplary embodiment of the disclosure.

FIG. 4 is a block diagram of a DID management device according to an exemplary embodiment of the disclosure. In an example, the DID management device 400 is an electronic device including a processor and a blockchain storage for storing authorized documents for DIDs.

FIG. 4 is a functional block diagram of the DID management device 400, and the storage 140 corresponds to the blockchain storage for storing authorized documents for DIDs. The communicator 410 is a wired or wireless communication module in charge of communication with the outside of the DID management device 400. The controller 420 is operated in a computing device including a processor. The processor which operates the controller 420 is configured to receive candidate documents including a DID. Subsequently, the processor is configured to decide the priority levels of the candidate documents for the DID. Also, the processor is configured to select a winner document which will have authority over the DID on the basis of priority levels. The processor is configured to register the winner document as an authorized document for the DID.

In an example, the DID management device 400 is a computing device configured to perform each operation of the DID management method.

Figure 5A:
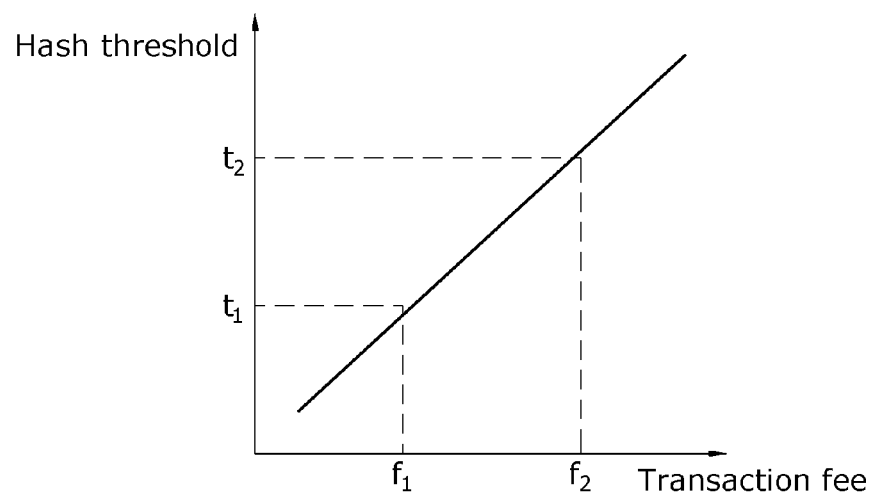
FIGS. 5A and 5B are a set of graphs showing priority level weighting and priority level filtering according to an example.
Figure 5B:
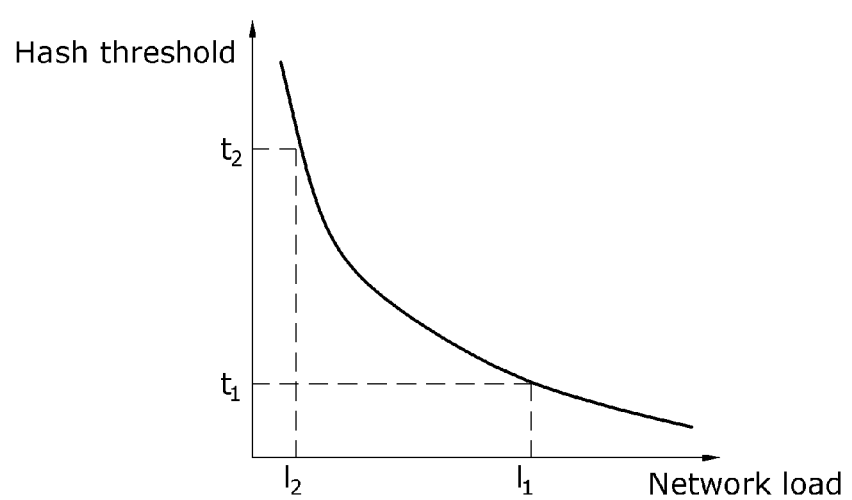

Meanwhile, priority levels decided in operation 220 may be weighted or filtered according to environmental conditions. FIGS. 5A and 5B are a set of graphs showing priority level weighting and priority level filtering according to an example. The controller 420 may selectively prevent a candidate document from being the winner document according to the priority level or hash value of the candidate document and from being registered as a DID record.

In an example, the controller 420 may give a weight to the priority level of each candidate document on the basis of the contributions of candidate documents. In other words, the controller 420 may heighten the ranking of a highly contributing candidate document by giving a weight to the priority level of the candidate document. The contribution may be, for example, a function of a transaction fee charged by a transaction of registering a DID record, and the weight of a priority level may be set according to the function. In this case, when a high fee is paid, a DID record may be registered with a hash value which is not small enough due to a weight proportionate to the fee, and a small amount of hash calculation may be performed for PoW. On the other hand, when a low fee is paid, a sufficiently low hash value may be required.

Likewise, the controller 420 may give differentiated thresholds to the priority levels of candidate documents on the basis of the contributions of the candidate documents. According to this method, a candidate document with a high contribution may become the winner document despite having a larger hash value than a candidate document with a low contribution.

FIG. 5A shows an example of a proportional relationship between a transaction fee and the weight of a priority level or a hash threshold. When a relatively low fee $f_1$ is paid, only a candidate document having a hash value smaller than a threshold $t_1$ may become the winner document and be registered. In this case, a candidate document having a hash value larger than the threshold $t_1$ is excluded from candidate documents which may become the winner document. When a relatively high fee $f_2$ is paid, a candidate document having a hash value smaller than a threshold $t_2$ may become the winner document and be registered. As shown in the drawing, the threshold $t_1$ in the case of paying the low fee $f_1$ is smaller than the threshold $t_2$ in the case of paying the high fee $f_2$. Likewise, a weight in the case of paying the low fee $f_1$ is smaller than a weight in the case of paying the high fee $f_2$. The weights are ratios for increasing a priority level (or the ranking of a priority value) in proportion to a paid fee.

In another example, the controller 420 may filter candidate documents. For example, the controller 420 may filter candidate documents on the basis of a previously decided threshold for priority levels.

According to such a filtering method, the controller 420 may decide a function of variables reflecting the state of a blockchain network (e.g., a transaction amount, the number of registered DID records, and the number of generated blocks) as a threshold for hash values.

For example, when the transaction amount of the blockchain network is not large, a candidate document having a hash value larger than that in the case of a large transaction amount may become the winner document and be registered as a DID record. On the other hand, when the transaction amount is large, only a candidate document having a hash value smaller than that in the case of a small transaction amount may become the winner document and be registered as a DID record.

In an example, the previously decided threshold may be decided according to a network state. FIG. 5B shows an example of an inverse proportional relationship between a network load (i.e., the transaction amount of the blockchain network) and a hash threshold. When the network load is small $I_2$, a candidate document having a hash value smaller than the threshold $t_2$ may become the winner document and be registered. On the other hand, when the network load is large $I_1$, a candidate document having a hash value smaller than the threshold $t_1$ may become the winner document. As can be seen in the drawing, the threshold $t_2$ in the case of a small network load is smaller than the threshold $t_1$ in the case of a large network load.

Meanwhile, the controller 420 may delay operation 230 of selecting a winner document of a DID in FIG. 2 according to a preset threshold. In this case, the controller 420 uses a constant set as the preset threshold.

For example, a malicious attacker may monitor a transaction in which a specific user registers a DID record and generate transactions for registering DID records in relation to the same DID so that several transactions for the same DID may be generated in the same block and hinder the DID record of the user from being registered. In preparation for such a malicious attack, the controller 420 may set the threshold of a priority level or a hash value to a constant. When the threshold of a priority level or a hash value is set to a constant, all users including a malicious attacker are forced to perform hash calculation for a certain time period, and thus it is possible to reduce the probability that the attacker will generate a valid transaction for the same DID within a time period in which the same block is generated. In this way, it is possible to block a malicious attack which can be generated in the case of giving authority to use a DID and strengthen the security of a system.

According to an embodiment, a method of managing a decentralized identifier, the method comprises receiving candidate documents including a decentralized identifier, deciding priority levels of the candidate documents for the decentralized identifier; and selecting a winner document which will have authority over the decentralized identifier on the basis of the priority levels.

The deciding of the priority levels comprises deciding the priority levels on the basis of hash values of the candidate documents.

The candidate documents include an additional property, and the priority levels of the candidate documents are adjustable on the basis of the additional property.

The additional property includes a random string.

The selecting of the winner document comprises selecting a candidate document having a minimum priority level value as the winner document of the decentralized identifier.

The method further comprises inquiring about a document registered in relation to the decentralized identifier; and when a registered document is present, recognizing the registered document as one of the candidate documents.

The method further comprises inquiring about a document registered in relation to the decentralized identifier, wherein the selecting of the winner document comprises, when a registered document is present, selecting the registered document as the winner document.

The method further comprises inquiring about a document registered in relation to the decentralized identifier, wherein when the registered document has been deleted or a validity period of the registered document has passed, the registered document is excluded from the candidate documents.

The method further comprises applying weights to the priority levels on the basis of contributions of the candidate documents.

The method further comprises filtering the candidate documents, wherein the filtering of the candidate documents comprises filtering the candidate documents on the basis of a threshold of the priority levels.

The threshold is decided according to a network state.

The selection of the winner document of the decentralized identifier is delayed according to the threshold.

The method further comprises registering the winner document as an authorized document for the decentralized identifier.

The registering of the winner document comprises generating a transaction for the authorized document and registering the authorized document in a blockchain storage.

According to an embodiment, an electronic device for managing a decentralized identifier, the electronic device comprises a blockchain storage configured to store an authorized document for a decentralized identifier and a processor configured to receive candidate documents including the decentralized identifier, decide priority levels of the candidate documents for the decentralized identifier, select a winner document which will have authority over the decentralized identifier on the basis of the priority levels, and register the winner document as the authorized document for the decentralized identifier.

The DID management device and method according to exemplary embodiments of the disclosure may be implemented in a computer system or recorded in a recording medium. The computer system may include at least one processor, a memory, a user input device, a data communication bus, a user output device, and a storage. The aforementioned elements perform data communication with each other through the data communication bus. The computer system may be, for example, a single server computer or a similar system or a plurality of servers arranged in one or more server banks or other arrangements. For example, the computer system may be a distributed processing system or parallel processing system based on a plurality of processors or a clustering server group. The computer system, such as a server or a server group, may be disposed in a single facility or distributed across many different geographical locations. Each server may include a processor, a communication interface, and a memory. The processor, the memory, and the communication interface may be connected to each other through a communication bus.

The computer system may further include a network interface coupled to a network. The processor may be a central processing unit (CPU) or a semiconductor device which processes instructions stored in the memory and/or the storage.

The memory and the storage may include various forms of volatile or non-volatile storage media. For example, the memory may include a read-only memory (ROM) and a random access memory (RAM).

The DID management method according to an exemplary embodiment of the disclosure may be implemented in a computer-executable manner. When the DID management method according to an exemplary embodiment of the disclosure is executed in a computer device, the method according to an exemplary embodiment of the disclosure may be performed through computer-readable instructions.

The above-described DID management method according to an exemplary embodiment of the disclosure may be implemented as computer-readable codes in a computer-readable recording medium. The computer-readable recording medium includes any type of recording medium in which data that can be interpreted by a computer system is stored. For example, the computer-readable recording medium may be a ROM, a RAM, a magnetic tape, a magnetic disk, a flash memory, an optical data storage device, and the like. Also, the computer-readable recording medium may be distributed to computer systems which are connected via a computer communication network and may be stored and executed as codes that can be read in a distributed manner.

According to various embodiments of the disclosure, it is possible to give authority over a DID selected by a user to the user on the basis of a priority level of the DID.

Also, according to various embodiments of the disclosure, it is possible to resolve collision when a readable identifier is used in a system for managing a DID.

Further, according to various embodiments of the disclosure, it is possible to prevent a malicious attack which can be made when authority to use a DID is given so that the security of a system may be improved.

The disclosure has been described in detail above with reference to exemplary embodiments. Those of ordinary skill in the technical field to which the disclosure pertains should be able to understand that various modifications and alterations can be made without departing from the fundamental features of the disclosure. Therefore, it should be understood that the disclosed embodiments are not limiting but illustrative. The scope of the disclosure is defined not by the above description but by the following claims, and it should be understood that all changes or modifications derived from the scope and equivalents of the claims fall within the scope of the disclosure.

What is claimed is:

1. A method of managing a decentralized identifier, the method comprising:
receiving a plurality of candidate documents including a decentralized identifier;
deciding authoritativeness of each of the candidate documents for the decentralized identifier; and
selecting a winner document which has authority to use the decentralized identifier from among the candidate documents on the basis of the authoritativeness,
wherein the candidate documents each further include an additional property, and
the authoritativeness of the candidate documents are adjustable on the basis of the additional property by adjusting a hash value of each of the candidate documents on the basis of the additional property, wherein as any of the candidate documents has a smaller hash value, the authoritativeness of the candidate document with the smaller hash value has a higher priority for the decentralized identifier.

2. The method of claim 1, wherein the deciding of the authoritativeness comprises deciding the authoritativeness on the basis of hash values of the candidate documents.

3. The method of claim 1, wherein the additional property includes a random string.

4. The method of claim 1, wherein the selecting of the winner document comprises selecting one of the candidate documents having a minimum priority level value as the winner document of the decentralized identifier.

5. The method of claim 1, further comprising:
inquiring about whether there is a document registered in relation to the decentralized identifier; and
when the registered document is present for the decentralized identifier, recognizing the registered document as one of the candidate documents.

6. The method of claim 1, further comprising inquiring about whether there is a document registered in relation to the decentralized identifier,
wherein the selecting of the winner document comprises, when the registered document is present for the decentralized identifier, selecting the registered document as the winner document.

7. The method of claim 1, further comprising inquiring about whether there is a document registered in relation to the decentralized identifier,
wherein when the registered document has been deleted or has expired, the registered document is excluded from the candidate documents.

8. The method of claim 1, further comprising applying weights to the authoritativeness on the basis of contributions of the candidate documents to give a higher priority ranking to a higher contributing one of the candidate documents.

9. The method of claim 1, further comprising filtering the candidate documents,
wherein the filtering of the candidate documents comprises filtering the candidate documents on the basis of thresholds of the authoritativeness.

10. The method of claim 9, wherein the threshold is decided according to a network state, wherein the network state includes a transaction amount, a number of registered decentralized identifier records, and a number of generated blocks.

11. The method of claim 9, wherein the selection of the winner document of the decentralized identifier is delayed according to the threshold.

12. The method of claim 1, further comprising registering the winner document as an authorized document for the decentralized identifier.

13. The method of claim 12, wherein the registering of the winner document comprises generating a transaction for the authorized document and registering the authorized document in a blockchain storage.

14. An electronic device for managing a decentralized identifier, the electronic device comprising:
a blockchain storage configured to store an authorized document for a decentralized identifier; and
a processor configured to:
receive a plurality of candidate documents, including the decentralized identifier, decide authoritativeness of each of the candidate documents for the decentralized identifier,
select a winner document which has authority to use the decentralized identifier from among the candidate documents on the basis of the authoritativeness, and
register the winner document as the authorized document for the decentralized identifier,
wherein the candidate documents each further include an additional property, and
the authoritativeness of the candidate documents are adjustable on the basis of the additional property by adjusting a hash value of each of the candidate documents on the basis of the additional property, wherein as any of the candidate documents has a smaller hash value, the authoritativeness of the candidate document with the smaller hash value has a higher priority for the decentralized identifier.

\* \* \* \* \*